United States Patent
Childress et al.

(10) Patent No.: US 9,577,940 B2
(45) Date of Patent: Feb. 21, 2017

(54) IDENTITY-AWARE LOAD BALANCING

(71) Applicant: International Business Machines Corporation, Armonk, NY (US)

(72) Inventors: Rhonda L. Childress, Austin, TX (US); Craig C. Dods, Ontario (CA); David B. Kumhyr, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 14/189,027

(22) Filed: Feb. 25, 2014

(65) Prior Publication Data
US 2015/0244626 A1 Aug. 27, 2015

(51) Int. Cl.
| | | |
|---|---|---|
| H04L 12/813 | (2013.01) | |
| H04L 12/803 | (2013.01) | |
| H04L 29/08 | (2006.01) | |
| H04L 12/863 | (2013.01) | |

(52) U.S. Cl.
CPC ............ *H04L 47/125* (2013.01); *H04L 67/10* (2013.01); *H04L 47/20* (2013.01); *H04L 47/622* (2013.01)

(58) Field of Classification Search
None
See application file for complete search history.

(56) References Cited

U.S. PATENT DOCUMENTS

| 7,302,634 | B2 | 11/2007 | Lucovsky et al. |
| 2008/0320060 | A1 | 12/2008 | Hardman et al. |
| 2009/0265704 | A1* | 10/2009 | Branda ............... G06F 9/5094 717/176 |
| 2013/0290537 | A1* | 10/2013 | Shaw ............... H04L 67/101 709/226 |
| 2014/0101306 | A1* | 4/2014 | Murgia ............... H04L 47/125 709/224 |

FOREIGN PATENT DOCUMENTS

WO 2009012992 A2 8/2009

OTHER PUBLICATIONS

Rodriguez et al; TCP/IP in a Sysplex, Mar. 2001.
Internet Society et al; DNS Support for Load Balancing, Sep. 13, 2000.

* cited by examiner

*Primary Examiner* — Hassan Phillips
*Assistant Examiner* — Ayanah George
(74) *Attorney, Agent, or Firm* — Garg Law Firm, PLLC; Rakesh Garg; Christopher K. McLane

(57) ABSTRACT

A method, system, and computer program product for identity-aware load balancing are provided in the illustrative embodiments. A sender of a packet is identified using an attribute communicated with the packet. The attribute is sufficient to identify a sender of the packet. The packet is directed to a set of resources managed by a load balancing application. A rule corresponding to the sender is selected. The rule is executed to identify a characteristic of an algorithm usable in a load balancing operation of the load balancing application. The packet and the identified characteristic of the algorithm are communicated to the load balancer. The communicating causes the load balancer to select an algorithm for a load balancing operation with the packet such that the selected algorithm includes the identified characteristic of the algorithm.

20 Claims, 7 Drawing Sheets

IDENTITY-AWARE LOAD BALANCING

TECHNICAL FIELD

The present invention relates generally to a method, system, and computer program product for load balancing in a data processing environment. More particularly, the present invention relates to a method, system, and computer program product for identity-aware load balancing.

BACKGROUND

Data processing environments often provide multiple resources, such as servers, to handle certain workloads. For example, a popular website or service is often supported by multiple web servers so that requests for the site or service from numerous browsers can be handled efficiently and without unacceptable delays.

The technique for distributing competing or similar workloads across a pool of similar or analogous resources is called load balancing. A load balancer is an application or a component that implements load balancing for a given pool of resources. Data processing systems and applications are some examples of resources, whose multiple instances can be pooled and managed by a load balancer. Requests, data transmissions, and job submissions directed towards such data processing systems or application instances are some examples of workloads that a load balancer can direct or manage for the resource pool.

Many different types of algorithms are presently available for load balancing. A load balancer executes a load balancing algorithm to select an instance of a pooled resource to which a given workload should be directed. For example, a random selection algorithm randomly selects any of the instances of the pooled resource and directs the workload at hand to that randomly selected resource instance. As another example, a round-robin algorithm sequences the resource instances in a pool, and progressively selects the next resource instance in the sequence to handle each subsequent workload.

As another example, a weighted round-robin algorithm implements the round-robin method, and further takes into consideration an amount of load a sequenced resource instance can handle to select an appropriate resource instance in the sequence. For example, if a server in the pool can handle twice the load of another server in the pool, the weighted round-robin algorithm counts the larger server twice in the sequence and the smaller server once, so that the larger server can receive twice the workload that the larger server can handle.

As another example, a fastest response load balancing algorithm selects that resource instance from the pool, which can respond to the workload the fastest at a given time. For example, some servers in a given pool may be more congested, utilized beyond a threshold, or have a comparatively lower throughput as compared to another server in the pool. The fastest response algorithm selects a resource with these and other similar considerations to provide the fastest response time for a given workload at a given time with a given pool of resources.

SUMMARY

The illustrative embodiments provide a method, system, and computer program product for identity-aware load balancing. An embodiment includes a method for identity-aware load balancing. The embodiment identifies, at an application executing in a data processing system, a sender of a packet using an attribute communicated with the packet, wherein the attribute is sufficient to identify a sender of the packet, and wherein the packet is directed to a set of resources managed by a load balancing application. The embodiment selects a rule corresponding to the sender. The embodiment executes, using a processor and a memory, the rule to identify a characteristic of an algorithm usable in a load balancing operation of the load balancing application. The embodiment communicates the packet and the identified characteristic of the algorithm to the load balancer, wherein the communicating causes the load balancer to select an algorithm for a load balancing operation with the packet such that the selected algorithm includes the identified characteristic of the algorithm.

Another embodiment includes a computer program product for identity-aware load balancing. The embodiment further includes one or more computer-readable tangible storage devices. The embodiment further includes program instructions, stored on at least one of the one or more storage devices, to identify, at an application executing in a data processing system, a sender of a packet using an attribute communicated with the packet, wherein the attribute is sufficient to identify a sender of the packet, and wherein the packet is directed to a set of resources managed by a load balancing application. The embodiment further includes program instructions, stored on at least one of the one or more storage devices, to select a rule corresponding to the sender. The embodiment further includes program instructions, stored on at least one of the one or more storage devices, to execute the rule to identify a characteristic of an algorithm usable in a load balancing operation of the load balancing application. The embodiment further includes program instructions, stored on at least one of the one or more storage devices, to communicate the packet and the identified characteristic of the algorithm to the load balancer, wherein the communicating causes the load balancer to select an algorithm for a load balancing operation with the packet such that the selected algorithm includes the identified characteristic of the algorithm.

Another embodiment includes a computer system for identity-aware load balancing. The embodiment further includes one or more processors, one or more computer-readable memories and one or more computer-readable tangible storage devices. The embodiment further includes program instructions, stored on at least one of the one or more storage devices for execution by at least one of the one or more processors via at least one of the one or more memories, to identify, at an application executing in a data processing system, a sender of a packet using an attribute communicated with the packet, wherein the attribute is sufficient to identify a sender of the packet, and wherein the packet is directed to a set of resources managed by a load balancing application. The embodiment further includes program instructions, stored on at least one of the one or more storage devices for execution by at least one of the one or more processors via at least one of the one or more memories, to select a rule corresponding to the sender. The embodiment further includes program instructions, stored on at least one of the one or more storage devices for execution by at least one of the one or more processors via at least one of the one or more memories, to execute the rule to identify a characteristic of an algorithm usable in a load balancing operation of the load balancing application. The embodiment further includes program instructions, stored on at least one of the one or more storage devices for execution by at least one of the one or more processors via at least one of the one or more memories, to communicate the packet and the identified characteristic of the algorithm to the load balancer, wherein the communicating causes the load balancer to select an algorithm for a load balancing operation with the packet such that the selected algorithm includes the identified characteristic of the algorithm.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
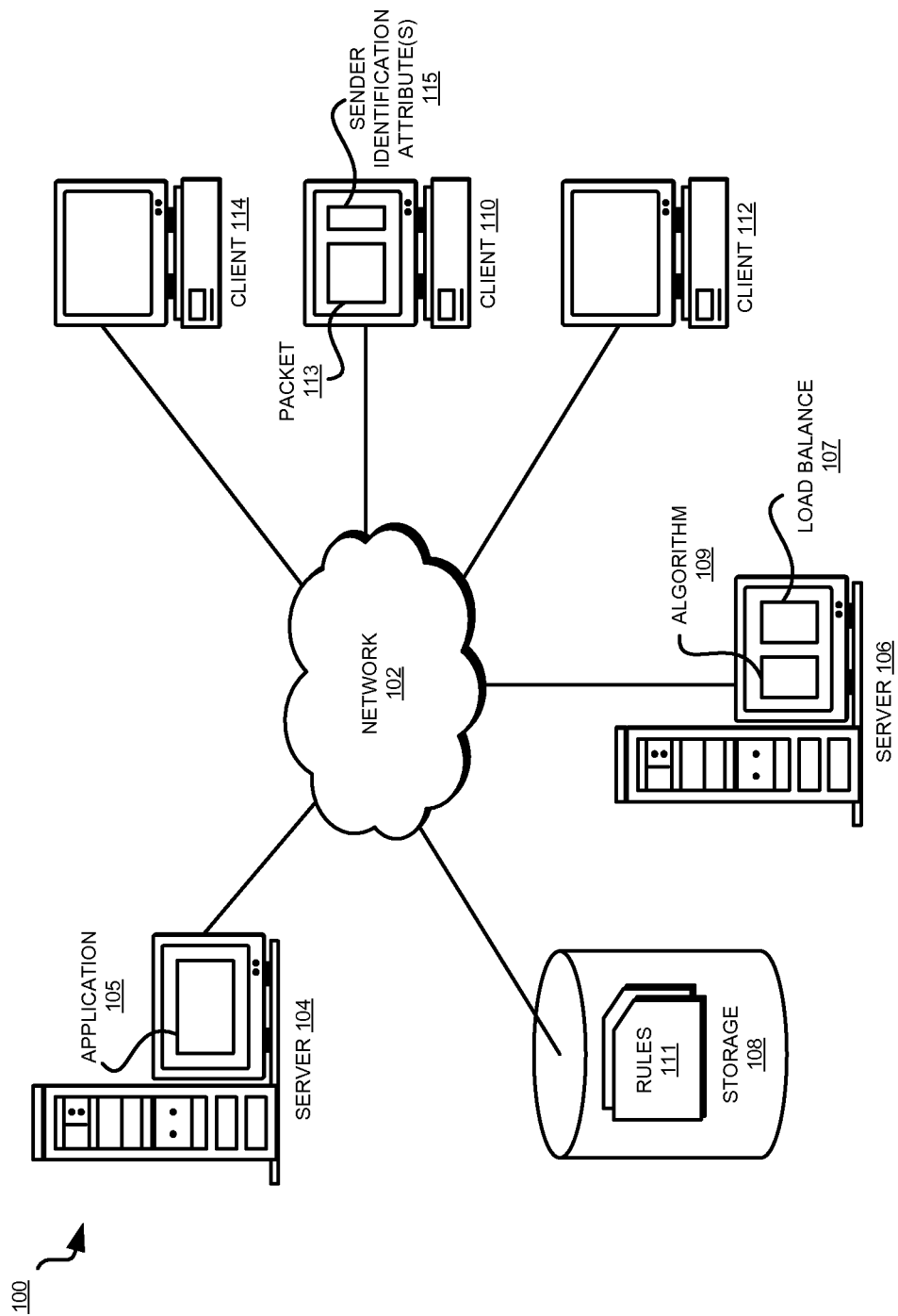
FIG. 1 depicts a block diagram of a network of data processing systems in which illustrative embodiments may be implemented.

Within the scope of this disclosure, a packet comprises a workload or a request of any suitable kind, or information thereof, that is directed towards a resource for processing. Furthermore, the directing of the packet, from a sender to the resource, can be with or without the awareness of the pooled nature of the resource.

The illustrative embodiments recognize that the presently used load balancing methodology only considers a state or condition of a resource to select that resource from the pool for handling a workload. The illustrative embodiments recognize that the present load balancing methodologies, techniques, and algorithms do not base any part of the load balancing determination on the identity of the sender of a packet that is directed to a pooled resource.

The illustrative embodiments recognize that regardless of the load balancing algorithm chosen to finally direct or forward the packet to an instance of the pooled resource, information about the origin of the packet is also useful in the load balancing exercise and the resulting user experience. The illustrative embodiments recognize that depending upon the roles of the users/senders, the load balancing algorithm, the pool of participating resource instances, or both, should change.

The illustrative embodiments recognize that it would be advantageous, for example, to select the pool or sub-pool of resource instances according to the sender's identity. The illustrative embodiments further recognize that it would be advantageous, for example, to select or change a load-balancing algorithm for the pool or sub-pool of resource instances, according to the sender's identity.

The illustrative embodiments used to describe the invention generally address and solve the above-described problems and other problems related to load balancing. The illustrative embodiments provide a method, system, and computer program product for identity-aware load balancing.

For example, the illustrative embodiments recognize that users can be associated with roles, such as by using the Interface for Metadata Access Points (IF-MAP) protocol. As an example, suppose three users, systems, or applications associated with those three users send packets to a pool of web servers. Further suppose that one user is associated with the role of an "employee," another user is associated with the role of a "manager," and another user is associated with the role of "CEO."

For example, assume that the web server pool has ten web servers S1-S10, of which two are high-performance servers (S1, S2), five are regular servers (S3-S7), and three have access to secure data (S8-S10).

In one example embodiment, when the sender of the packet is an employee or associated with an employee role, the resources that participate in the load balancing from a sub-pool, which includes servers S3-S7. When the sender is a manager or associated with a manager role, the resources that participate in the load balancing from a sub-pool, which includes servers S1-S7. When the sender is the CEO or associated with a CEO role, the resources that participate in the load balancing from a sub-pool, which includes servers S1-S10.

In another example embodiment, when the sender of the packet is an employee or associated with an employee role, the load balancing algorithm to use for directing, delivering, forwarding, or scheduling the employee's packet is a first algorithm, e.g., a round-robin algorithm, applied across the entire pool S1-S10. When the sender of the packet is a manager or associated a manager role, the load balancing algorithm to use for directing, delivering, forwarding, or scheduling the manager's packet is a second algorithm, e.g., a random algorithm, applied across the entire pool S1-S10. When the sender of the packet is a CEO or associated a CEO role, the load balancing algorithm to use for directing, delivering, forwarding, or scheduling the CEO's packet is a third algorithm, e.g., a fastest response algorithm, applied across the entire pool S1-S10.

In another example embodiment, when the sender of the packet is an employee or associated with an employee role, the load balancing algorithm to use for directing, delivering, forwarding, or scheduling the employee's packet is a first algorithm, e.g., a round-robin algorithm, applied across the sub-pool of servers S3-S7. When the sender of the packet is a manager or associated a manager role, the load balancing algorithm to use for directing, delivering, forwarding, or scheduling the manager's packet is a second algorithm, e.g., a random algorithm, applied across the sub-pool of servers S1-S7. When the sender of the packet is a CEO or associated a CEO role, the load balancing algorithm to use for directing, delivering, forwarding, or scheduling the CEO's packet is a third algorithm, e.g., a fastest response algorithm, applied across the sub-pool of servers S1-S2 and S8-S10.

The role of a user is only described as an example without implying any limitation on the illustrative embodiments thereto. Any suitable attribute that is usable to identify a sender, e g, a user, an application, or a system sender of packet, can be similarly utilized to guide, change, adjust or otherwise modify the load balancing operation based on sender's identity.

The web servers, and the pool and the sub-pools thereof, are also described only as examples without implying a limitation on the illustrative embodiments. Other resources can similarly be used in pools and sub-pools in a similar manner within the scope of the illustrative embodiments. Furthermore, the pool and sub-pools of resources can be dynamic, to wit, changing over time, changing in correspondence with the sender identities available with the packets at a given time, changing with the availability of resources or resource instances, policy changes, rule changes, algorithm changes, changes in the data processing environment, or a combination thereof.

Furthermore, the embodiments are described with respect to using the sender identity to form or change resource pools or sub-pools, select or change load balancing algorithms, or a combination thereof only for the clarity of the description. Other aspects of load balancing can also be affected by sender-identity according to the illustrative embodiments. For example, when packets are received from multiple senders, those packets are queued for load balancing. An embodiment can be modified or configured to change the queuing algorithm or queuing priority of the packets based on the identity of their respective senders. For example, a packet from the CEO role in the above example can be queued such that the packet is the first out of the queue for sender-identity based load balancing operation described in earlier examples, regardless of the population of other packets in the queue. Similarly, a packet from the employee role in the above example can be queued such that the packet is queued using first in first out (FIFO) method. Similarly, a packet from the manager role in the above example can be queued such that the packet is queued using first in first out (FIFO) method but only relative to other packets from other manager senders, and ahead of any packets waiting in the queue from any employee senders.

Many other examples of the other aspects of load balancing, which can also be affected by sender-identity according to the illustrative embodiments, are similarly conceivable from this disclosure by those of ordinary skill in the art and the same are contemplated within the scope of the illustrative embodiments. For example, an embodiment can be configured, for load-balancing purposes, to adjust the priority of a packet, based on the packet sender's identity attributes received with the packet, for reaching a certain resource over a network. As another example, an embodiment can be configured, for load-balancing purposes, to adjust the priority of a packet, based on the packet sender's identity attributes received with the packet, for processing by a certain resource once the packet reaches the resource.

As another example, an embodiment can be configured, for load-balancing purposes, to direct a packet based on the packet sender's identity attributes received with the packet, to a resource that has certain privileges, access availability, or capabilities. As another example, an embodiment can be configured, for load-balancing purposes, to direct a packet based on the packet sender's identity attributes received with the packet, to a reserved resource. As another example, an embodiment can be configured, for load-balancing purposes, to direct a packet based on the packet sender's identity attributes received with the packet, to a resource on a different network or sub-network.

As another example, an embodiment can be configured, for load-balancing purposes, to direct a packet based on the packet sender's identity attributes received with the packet, to a resource and instruct the resource to process the packet in a certain manner. For example, an embodiment can cause the load balancing operation to instruct the resource to process the packet with a higher than a threshold priority, quality of service, acceleration, or data compression, or to use a certain type of encryption or decryption, use a specific method of processing, or according to a different workflow.

The illustrative embodiments are described with respect to certain load balancing operations, packets, requests, workloads, roles, sender identifying attributes, rules, policies, algorithms, forms of data, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
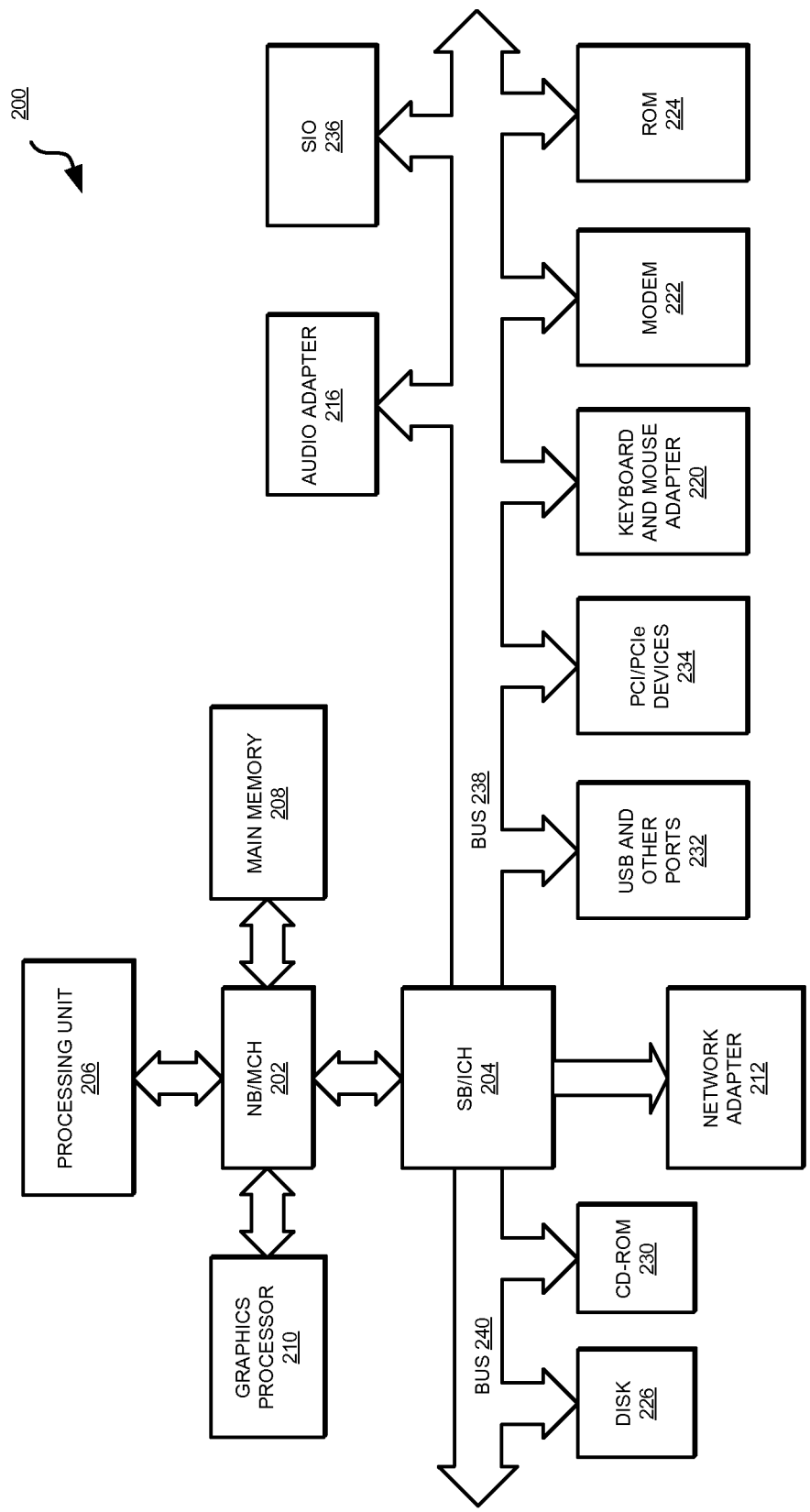
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wired, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. For example, Application 105 in server 104 implements an embodiment described herein. Load balancer 107 in server 106 implements a load balancing application or component to be used within or in conjunction with application 105 as described herein. Algorithms 109 accessible from server 106 include one or more algorithms for load balancing as described herein. Rules 111 in storage 108 are rules for performing sender-identity-based selections and operations as described herein. Packet 113 in client 110 is an example of a packet that can be directed by load balancer 107 to a pooled resource in data processing environment 100. Sender identification attribute(s) 115 in client 110 can be any suitable attribute usable to identify the sender of packet 113. For example, a user's role, a user-id, a machine identifier, an application identifier, or a combination thereof, can be included in attributes 115. As an example, certain data processing systems connected via network 102, including but not limited to servers 104 and 106 in some cases, may form a pool of computing resources.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105, load balancer 107, algorithms 109, and rules 111 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
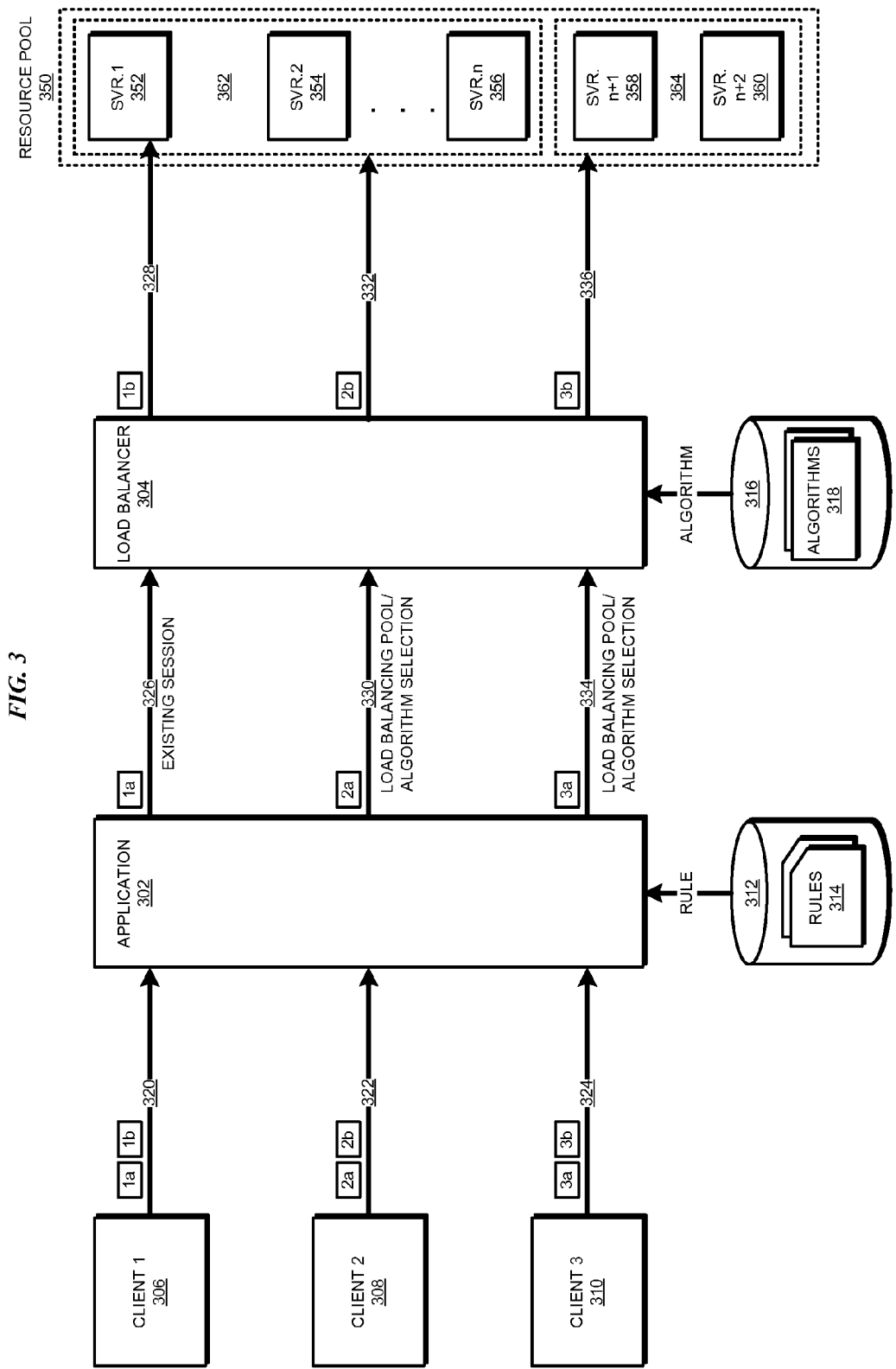
FIG. 3 depicts a block diagram of a configuration for identity-aware load balancing in accordance with an illustrative embodiment.

With reference to FIG. 3, this figure depicts a block diagram of a configuration for identity-aware load balancing in accordance with an illustrative embodiment. Application 302 is an example of application 105 in FIG. 1. Load balancer 304 is an example of load balancer 107 in FIG. 1.

Clients 306, 308, and 310 comprise any number and types of sender applications or systems. Each sender, e.g., client 306 labeled "Client 1", is identifiable as or associated with a sender that is distinct from another sender, e.g., client 308 labeled "Client 2" or client 310 labeled "Client 3". For example, Client 1 may be associated with a user with an "employee" role, Client 2 may be an application authorized to present requests or packets on behalf of a "manager" role, and Client 3 may be a system configured to be operated by, on behalf of, or as a "CEO" role.

Repository 312 includes a set of rules, rules 314. Each rule in rules 314 is configured to enable application to determine a manner of load balancing based on a packet sender's identity. Some examples of this determination are described earlier in the disclosure. More details of this determination process will become clear later in this disclosure.

Repository 316 includes a set of load balancing algorithms, algorithms 318. Each algorithm in algorithms 318 is usable by load balancer 304 to perform some operation related to load balancing of several packets received from several senders, such as from clients 306, 308, and 310, across resource pool 350. As an example, some algorithms in algorithms 318 can be configured for selecting a resource from resource pool 350, adjusting a queuing priority of a packet, adjusting a priority to access a certain resource, allowing access to a reserved or privileged resource, routing to a specific resource, adjusting a quality of service for a packet, and many other load balancing related operations or sub-operations described throughout this disclosure.

Resource pool 350 comprises any number and types of resources or resource instances 352, 354, 356, 358, and 360. In the example depiction, the resources participating in resource pool 350 are server systems or server applications. Accordingly, resource 352 is labeled "Server 1", resource 354 is labeled "Server 2", resource 356 is labeled "Server n", resource 358 is labeled "Server n+1", and resource 360 is labeled "Server n+2". Resource sub-pools 362 and 364 include distinct or overlapping subsets of the set of resources included in resource pool 350.

In operation, assume that Client 1 sends (communication 320) packet 1a for accessing a service or data provided by the pooled resources of resource pool 350. Further assume that Client 1 also sends (communication 320) sender identification attribute 1b with packet 1a. In one example, attribute 1b is indicative of a role mapped to a user according to IF-MAP protocol. In another example, attribute 1b is indicative of a user's, system's, or application's identity in any suitable manner as described by examples elsewhere in this disclosure.

Client 2 similarly sends (communication 322) packet 2a and sender identification attribute 2b. Client 3 sends (communication 324) packet 3a and sender identification attribute 3b in a similar manner. Note that attributes 1b, 2b, and 3b need not be all of the same type or form and may identify the sender as a user, a system, an application, or a combination thereof.

Application 302 operates in conjunction with load balancer 304. Application 302 receives packets 1a, 2a, and 3a, along with corresponding sender identification attributes 1b, 2b, and 3b, respectively.

In an example operation, application 302 determines that packet 1a pertains to an existing session with a resource in resource pool 350. According to a rule from rules 314, application communicates (communication 326) to load balancer 304 that packet 1a should be routed, directed, or managed according to the existing session. Using an algorithm from algorithms 318, or otherwise, load balancer 304 directs (communication 328) packet 1a to the resource that is participating in that existing session, e.g., resource 352.

In another example operation, application 302 determines that packet 2a is related to a sender identity of attribute 2b. In one embodiment, application 302 verifies that sender identity before proceeding further. Any existing verification process can be used for this verification operation. In one embodiment, the application further determines whether the identified sender is authorized to send the corresponding packet.

According to a rule from rules 314, application communicates (communication 330) to load balancer 304 that packet 2a should be routed, directed, or managed such that a particular load balancing algorithm or a type of algorithm is employed for the management of packet 2a. Alternatively, or in conjunction with suggesting the algorithm, application 302 can also communicate (communication 330) to load balancer 304 a specific pool, sub-pool, or a characteristic thereof, that should be used for managing packet 2a. Using an algorithm from algorithms 318 according to communication 330, load balancer 304 directs (communication 332) packet 2a to an appropriate resource pool or sub-pool, e.g., resource sub-pool 362.

For example, load balancer 304 may select sub-pool 362 using an algorithm from algorithms 318, such that the selected sub-pool has a characteristic specified in communication 330. Some example characteristics of a sub-pool include but are not limited to performance metrics, utilization, security level, authorization or access parameters, access to specific resources, restrictions, configuration, availability of specific components, and so on.

In another example operation, application 302 determines that packet 3a is related to a sender identity of attribute 3b. In one embodiment, application 302 verifies that sender identity before proceeding further.

According to a rule from rules 314, application communicates (communication 334) to load balancer 304 that packet 3a should be routed, directed, or managed such that a particular load balancing algorithm or a type of algorithm is employed for the management of packet 3a. Alternatively, or in conjunction with suggesting the algorithm, application 302 can also communicate (communication 334) to load balancer 304 a specific pool, sub-pool, or a characteristic thereof, that should be used for managing packet 3a. Using an algorithm from algorithms 318 according to communication 334, load balancer 304 directs (communication 336) packet 3a to an appropriate resource pool or sub-pool, e.g., resource sub-pool 364. For example, load balancer 304 may select sub-pool 364 using an algorithm from algorithms 318, such that the selected sub-pool has a characteristic specified in communication 334.

Figure 4:
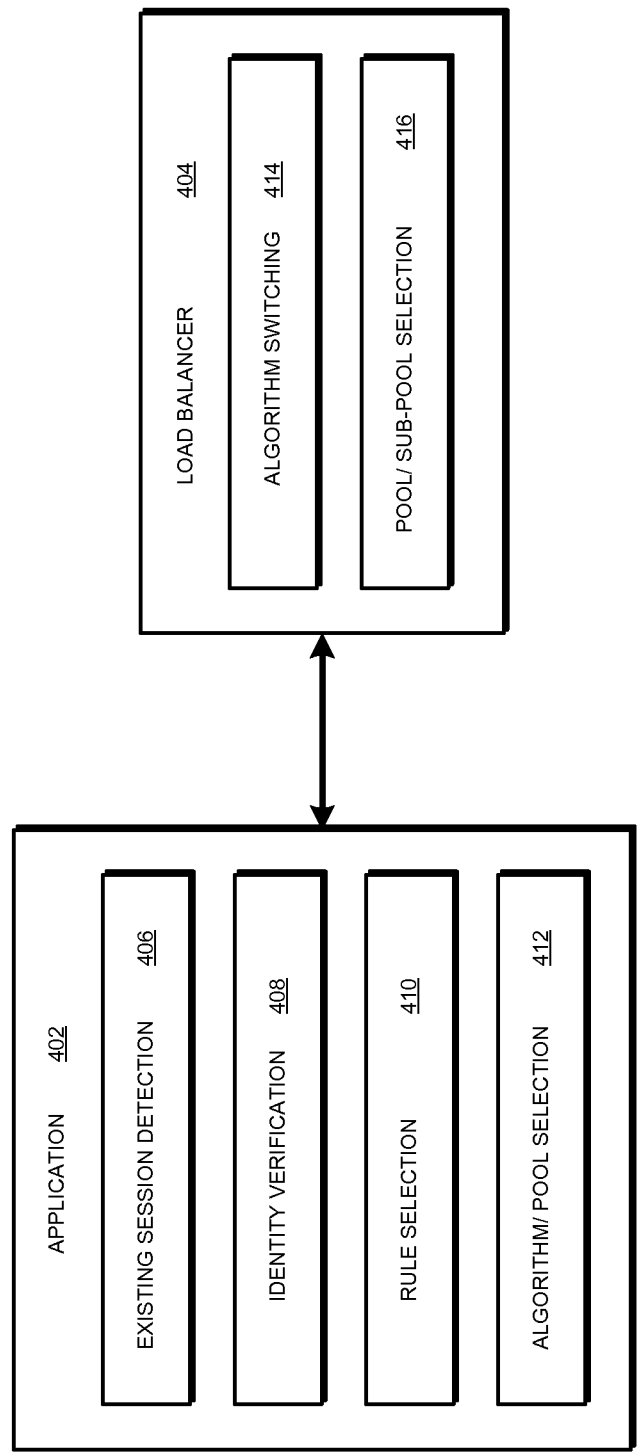
FIG. 4 depicts a block diagram of a configuration for identity-aware load balancing in accordance with an illustrative embodiment.

With reference to FIG. 4, this figure depicts a block diagram of a configuration for identity-aware load balancing in accordance with an illustrative embodiment. Application 402 is an example of application 302 in FIG. 3. Load balancer 404 is an example of load balancer 304 in FIG. 3.

Application 402 includes component 406 to detect whether a packet is related to an existing session with a pooled resource. Component 408 verifies the identity of the sender using a sender identification attribute, such as attributes 1b, 2b, or 3b in FIG. 3. Component 408 can be configured to use an external entity, system, or service provider to verify the identity within the scope of the illustrative embodiments.

Component 410 selects a rule, such as from rules 314 in FIG. 3, according to the sender's identity. Component 412 executes the rule to determine a specific load balancing algorithm, a type of algorithm, a resource pool, a resource sub-pool, a characteristic of the pool or sub-pool, or a combination thereof. The selected algorithm, type of algorithm, pool, sub-pool, or pool characteristic is then used for load balancing processing of the packet associated with the sender's identity.

Load balancer 404 includes inter alia, component 414 to select or switch to an algorithm for a load balancing operation. For example, component 414 of load balancer 404 selects the algorithm or type of algorithm identified by component 412 of application 402, or switches to such algorithm or type from a previous algorithm or type of algorithm, for processing the packet for which component 412 made the identification. Component 416 selects the pool or sub-pool that either is identified by component 412 of application 402, or is suitable for processing the packet for which component 412 made the identification.

Figure 5:
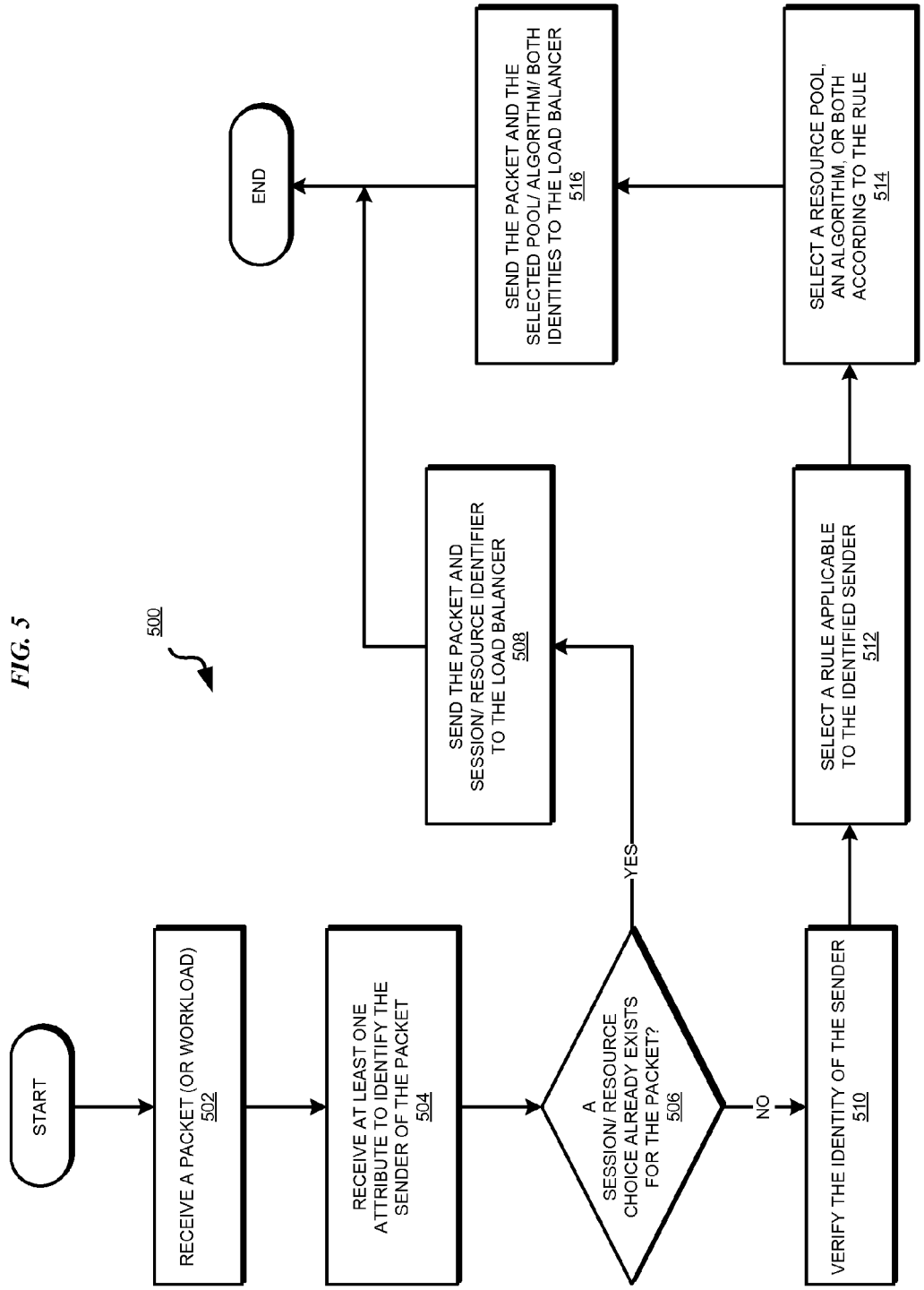
FIG. 5 depicts a flowchart of an example process for identity-aware load balancing in accordance with an illustrative embodiment.

With reference to FIG. 5, this figure depicts a flowchart of an example process for identity-aware load balancing in accordance with an illustrative embodiment. Process 500 can be implemented in application 402 of FIG. 4.

The application receives a packet (block 502). The application also receives at least one attribute that is usable to identify the sender of the packet (block 504).

The application determines whether a session already exists or a resource has already been selected for the packet (block 506). If a session or a resource selection already exists ("Yes" path of block 506), the application sends the packet to a load balancer along with a suitable identifier of the session, the selected resource, or both (block 508).

If a session or a resource selection does not already exists ("No" path of block 506), the application optionally verifies the identity of the sender from the attribute received in block 504 (block 510). The application selects a rule applicable to packets from the identified sender (block 512). The application selects a specific load balancing algorithm, a type or other characteristic of a load balancing algorithm, a resource pool, a resource sub-pool, a characteristic of the pool or sub-pool, or a combination thereof, according to the rule (block 514). The application sends the packet and the selected load balancing algorithm, type or other characteristic of a load balancing algorithm, resource pool, resource sub-pool, characteristic of the pool or sub-pool, or a combination thereof, to the load balancer for further processing of the packet (block 516). The application ends process 500 thereafter, or returns to block 502 (not shown) for processing another packet in a similar manner.

Figure 6:
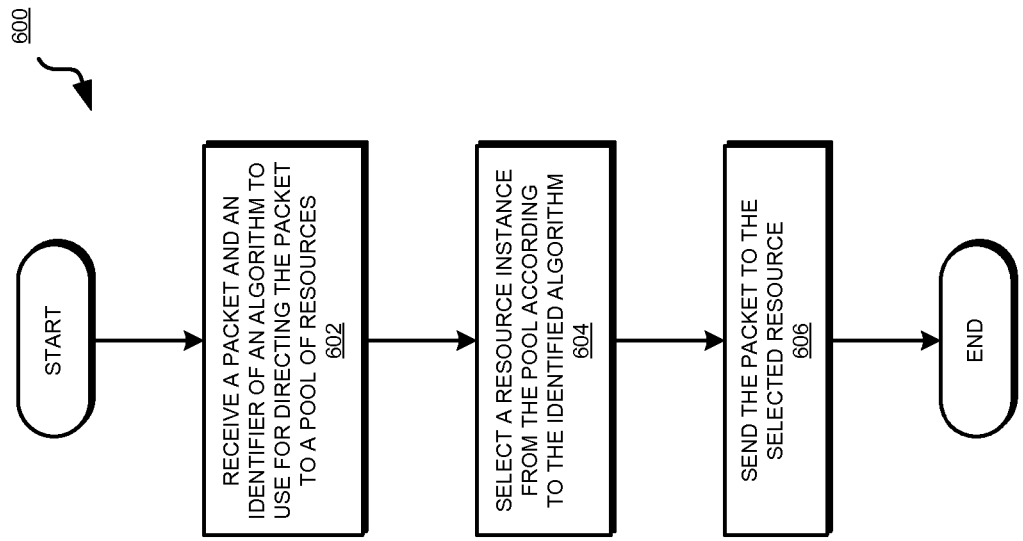
FIG. 6 depicts a flowchart of an example process of modifying a load balancing operation based on a packet sender's identity in accordance with an illustrative embodiment.

With reference to FIG. 6, this figure depicts a flowchart of an example process of modifying a load balancing operation based on a packet sender's identity in accordance with an illustrative embodiment. Process 600 can be implemented in load balancer 404 in FIG. 4.

The load balancer receives a packet, and a selected load balancing algorithm or a specified type or other characteristic of a load balancing algorithm, to use for directing the packet in a load balancing operation (block 602). The load balancer selects a resource from a pool or sub-pool of resources according to the selected algorithm (block 604). When a type or characteristic of the algorithm is specified in block 602, the load balancer selects the algorithm (not shown) before performing block 604. The load balancer sends, or schedules for sending, the packet to the selected resource (block 606). The load balancer ends process 600 thereafter or returns (not shown) to block 602 for sender-specific, or sender-identity-aware, load balancing operation with another packet.

Figure 7:
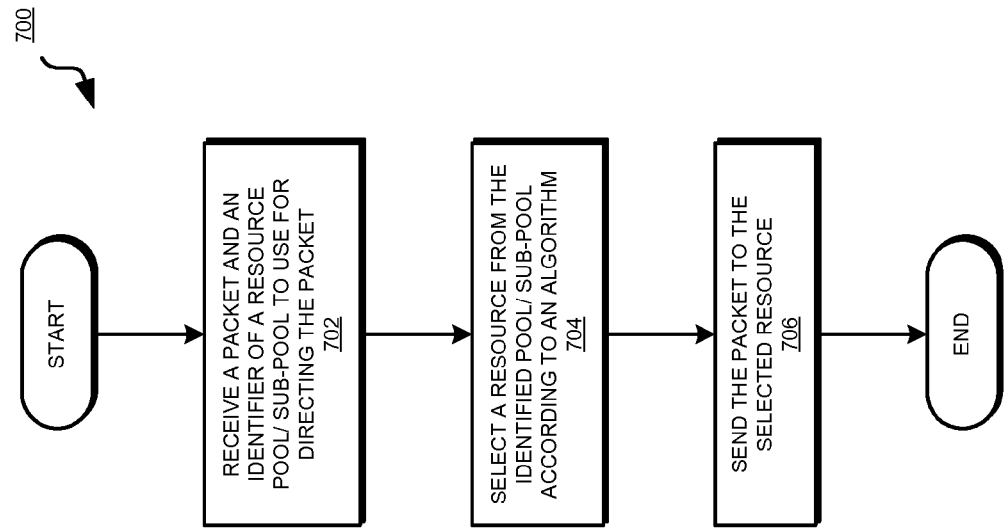
FIG. 7 depicts a flowchart of another example process of modifying a load balancing operation based on a packet sender's identity in accordance with an illustrative embodiment.

With reference to FIG. 7, this figure depicts a flowchart of another example process of modifying a load balancing operation based on a packet sender's identity in accordance with an illustrative embodiment. Process 700 can be implemented in load balancer 404 in FIG. 4.

The load balancer receives a packet, and an identified pool or sub-pool of resources, or a characteristic thereof, to use for directing the packet in a load balancing operation (block 702). The load balancer selects a resource from the pool or sub-pool of resources according to a load balancing algorithm (block 704). When a type or characteristic of the algorithm is also specified in block 702, the load balancer selects the specified algorithm or an algorithm of the specified type or characteristic (not shown) before performing block 604. The load balancer sends, or schedules for sending, the packet to the selected resource (block 706). The load balancer ends process 700 thereafter or returns (not shown) to block 702 for sender-specific, or sender-identity-aware, load balancing operation with another packet.

Thus, a computer implemented method, system, and computer program product are provided in the illustrative embodiments for identity-aware load balancing.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method for identity-aware load balancing, the method comprising:

identifying, using an attribute communicated with a packet, at an application executing in a data processing system, a sender of the packet, wherein the packet is directed to a set of resources managed by a load balancer;

selecting a rule corresponding to the sender;

changing, based on the sender, a manner of queuing the packet at the load balancer prior for a load balancing operation using a subset of resources;

executing, using a processor and a memory, the rule to identify a characteristic of an algorithm, the identified characteristic being usable in the load balancing operation of the load balancer;

communicating the packet and the identified characteristic of the algorithm to the load balancer;

causing, responsive to the communicating, the load balancer to select an algorithm for a load balancing operation with the packet such that the selected algorithm includes the identified characteristic of the algorithm; and further causing, responsive to the communicating, the load balancing operation to instruct the subset of resources to use a determined type of cryptography with the packet.

2. The method of claim 1, further comprising:

causing the load balancer to switch from a previously selected algorithm for the load balancing operation to the selected algorithm having the identified characteristic of the algorithm, wherein the previously selected algorithm does not include the characteristic of the algorithm.

3. The method of claim 1, wherein the characteristic of the algorithm identifies a specific algorithm.

4. The method of claim 1, wherein the characteristic of the algorithm comprises a type of algorithm.

5. The method of claim 1, wherein each resource in the set of resources is configured to perform at least one operation in a manner similar to another resource in the set of resources, the processing of the packet by any resource in the set of resources comprising the at least one operation, further comprising:

identifying, from executing the rule, a characteristic of a resource for processing the packet; and selecting, to include in the subset of resources, the resource from the set of resources for the processing of the packet.

6. The method of claim 5, wherein the characteristic of the resource identifies a subset of resources, wherein each resource in the subset includes the characteristic of the resource.

7. The method of claim 5, wherein the characteristic of the resource identifies a capability available at the resource.

8. The method of claim 1, further comprising:

verifying, using an identity verification entity, an identity of the sender from the attribute.

9. The method of claim 8, further comprising:

determining whether the sender is authorized to send the packet.

10. The method of claim 1, further comprising:

receiving the packet; and receiving the attribute, wherein the attribute identifies a role of the sender.

11. The method of claim 10, wherein the sender is a user, and wherein the role is associated with the user.

12. The method of claim 10, wherein the sender is an application, the application being associated with a user who is distinct from the sender, wherein the role is associated with the user, and wherein the application presents the role in the attribute on behalf of the user.

13. The method of claim 10, wherein the sender comprises a data processing system associated with a user, wherein the role is associated with the user, and wherein the data processing system presents the role in the attribute on behalf of the user.

14. The method of claim 1, wherein the method is embodied in a computer program product comprising one or more computer-readable tangible storage devices and computer-readable program instructions which are stored on the one or more computer-readable tangible storage devices and executed by one or more processors.

15. The method of claim 1, wherein the method is embodied in a computer system comprising one or more processors, one or more computer-readable memories, one or more computer-readable tangible storage devices and program instructions which are stored on the one or more computer-readable tangible storage devices for execution by the one or more processors via the one or more memories and executed by the one or more processors.

16. A computer program product for identity-aware load balancing, the computer program product comprising:

one or more computer-readable tangible storage devices;

program instructions, stored on at least one of the one or more storage devices, to identify, using an attribute communicated with a packet, at an application executing in a data processing system, a sender of the packet, wherein the packet is directed to a set of resources managed by a load balancer;

program instructions, stored on at least one of the one or more storage devices, to select a rule corresponding to the sender;

program instructions, stored on at least one of the one or more storage devices, to change, based on the sender, a manner of queuing the packet at the load balancer prior for a load balancing operation using a subset of resources;

program instructions, stored on at least one of the one or more storage devices, to execute the rule to identify a characteristic of an algorithm, the identified characteristic being usable in the load balancing operation of the load balancer;

program instructions, stored on at least one of the one or more storage devices, to communicate the packet and the identified characteristic of the algorithm to the load balancer;

program instructions, stored on at least one of the one or more storage devices, to cause, responsive to the communicating, the load balancer to select an algorithm for a load balancing operation with the packet such that the selected algorithm includes the identified characteristic of the algorithm; and program instructions, stored on at least one of the one or more storage devices, to further cause, responsive to the communicating, the load balancing operation to instruct the subset of resources to use a determined type of cryptography with the packet.

17. The computer program product of claim 16, further comprising:

program instructions, stored on at least one of the one or more storage devices, to cause the load balancer to switch from a previously selected algorithm for the load balancing operation to the selected algorithm having the identified characteristic of the algorithm, wherein the previously selected algorithm does not include the characteristic of the algorithm.

18. The computer program product of claim 16, wherein the characteristic of the algorithm identifies a specific algorithm.

19. The computer program product of claim 16, wherein the characteristic of the algorithm comprises a type of algorithm.

20. A computer system for identity-aware load balancing, the computer system comprising:

one or more processors, one or more computer-readable memories and one or more computer-readable tangible storage devices;

program instructions, stored on at least one of the one or more storage devices for execution by at least one of the one or more processors via at least one of the one or more memories, to identify, using an attribute communicated with a packet, at an application executing in a data processing system, a sender of the packet, wherein the packet is directed to a set of resources managed by a load balancer;

program instructions, stored on at least one of the one or more storage devices for execution by at least one of the one or more processors via at least one of the one or more memories, to select a rule corresponding to the sender;

program instructions, stored on at least one of the one or more storage devices for execution by at least one of the one or more processors via at least one of the one or more memories, to change, based on the sender, a manner of queuing the packet at the load balancer prior for a load balancing operation using a subset of resources;

program instructions, stored on at least one of the one or more storage devices for execution by at least one of the one or more processors via at least one of the one or more memories, to execute the rule to identify a characteristic of an algorithm, the identified characteristic being usable in a load balancing operation of the load balancer;

program instructions, stored on at least one of the one or more storage devices for execution by at least one of the one or more processors via at least one of the one or more memories, to communicate the packet and the identified characteristic of the algorithm to the load balancer;

program instructions, stored on at least one of the one or more storage devices for execution by at least one of the one or more processors via at least one of the one or more memories, to cause, responsive to the communicating, the load balancer to select an algorithm for the load balancing operation with the packet such that the selected algorithm includes the identified characteristic of the algorithm; and program instructions, stored on at least one of the one or more storage devices for execution by at least one of the one or more processors via at least one of the one or more memories, to further cause, responsive to the communicating, the load balancing operation to instruct the subset of resources to use a determined type of cryptography with the packet.

* * * * *